United States Patent Office 3,462,023
Patented Aug. 19, 1969

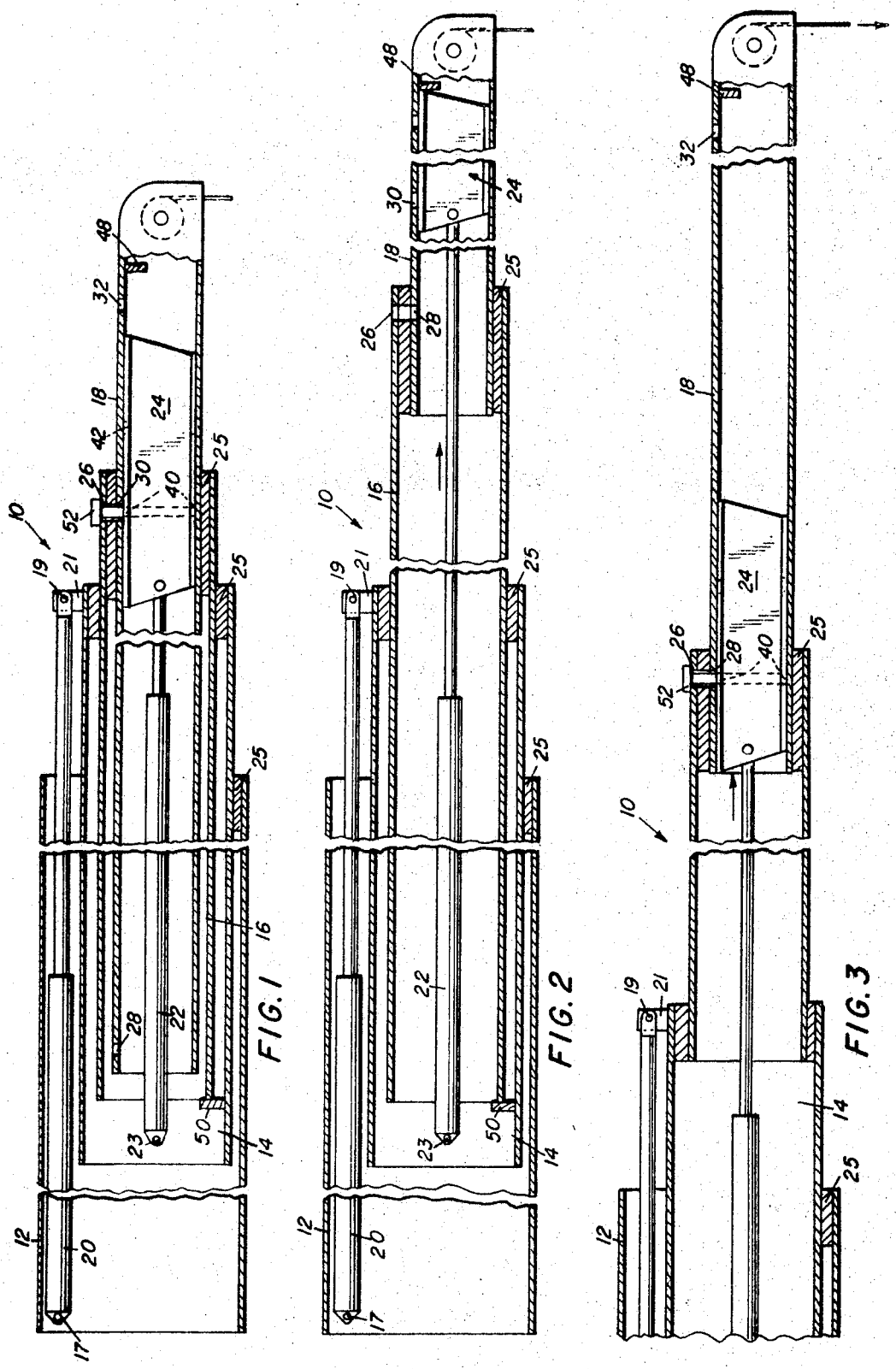

3,462,023
REINFORCEMENT MEMBER FOR TELESCOPING BOOM ASSEMBLY
John L. Grove, Greencastle, Pa., assignor, by mesne assignments, to Grove Manufacturing Company, Shady Grove, Pa., a corporation of Pennsylvania and a wholly-owned subsidiary of Walter Kidde & Company, Inc.
Filed July 12, 1967, Ser. No. 652,863
Int. Cl. B66c 23/06, 23/62
U.S. Cl. 212—55    2 Claims

ABSTRACT OF THE DISCLOSURE

This invention relates generally to telescopic crane booms and more particularly to means for reinforcing the area of juncture between the fly section and third section of a four-section, fully extendible and retractable, heavy-duty, telescopic boom.

---

The telescopic crane boom of the present invention is intended for use on a vehicle body to provide a heavy-duty mobile hydraulic crane. The type of extending mechanism in the instant invention is designed to deal with load capacities for forty tons or more. The use of fluid motors has proven to be most efficient for use in this load range. A principal object of this invention is to provide a telescoping boom assembly wherein a relatively lightweight sliding block provides major structural reinforcement to the fly section as well as providing a connecting aid between successive boom extensions and their hydraulic power units.

Another object of the invention is to provide a construction of a four-section hydraulically extendible boom having a gradual reduction in the cross-section of successive boom sections while maintaining the cross-section of the successive sections at a minimum and providing a movable reinforcement member for the boom section of least cross-section.

A further objective of this invention is to provide an elongated member which is slidably received within the fly section of the boom and is constructed to reinforce the fly member at the place of greatest stress when the fly is extended.

Another objective of this invention is to provide replaceable bearing surfaces between the fly section and the telescoping boom such that those areas which are most likely to become worn may be replaced.

Figure 4:
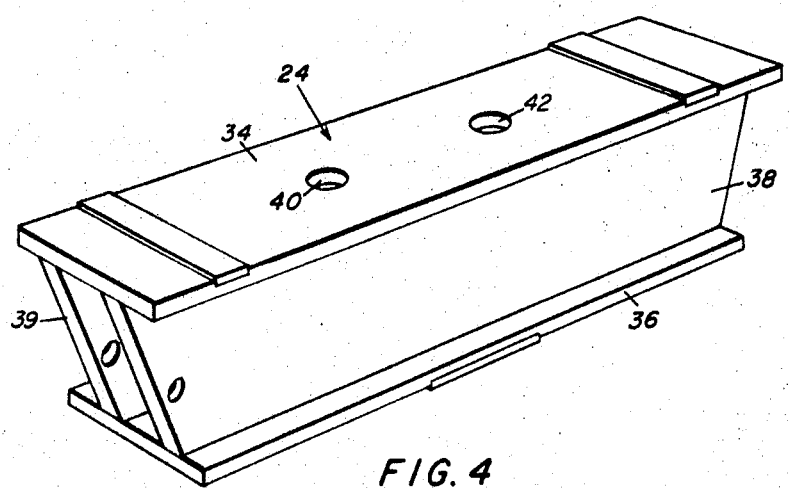
Figure 5:
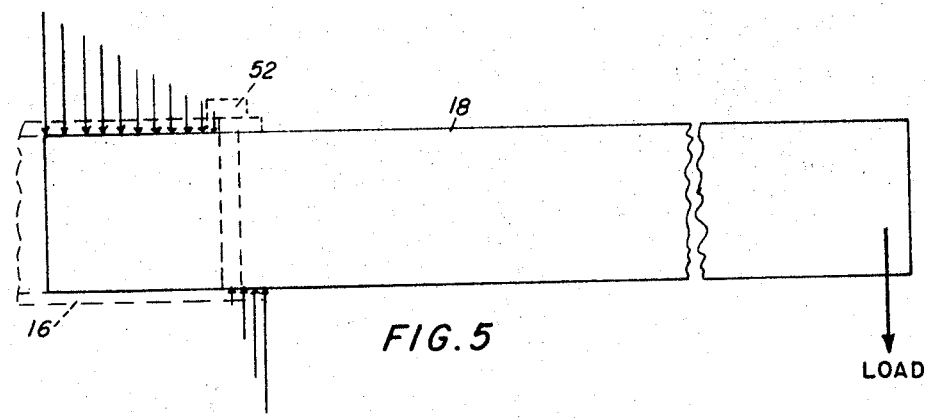
Figure 6:
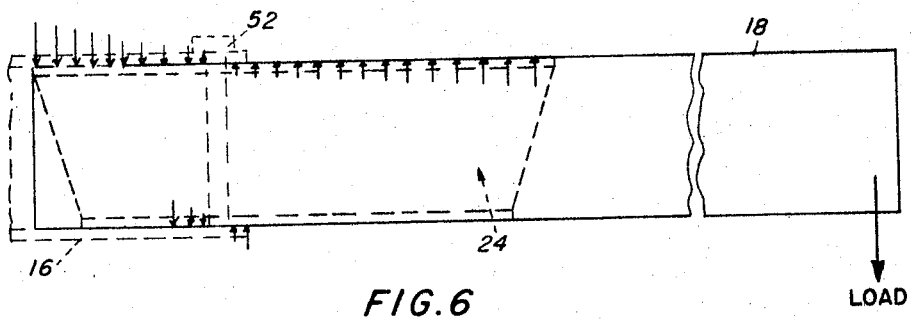

These and other objects of the invention will become more apparent to those skilled in the art by reference to the following detailed description when viewed in light of the accompanying drawings wherein:

FIGURE 1 is a cross-sectional view of the boom assembly in its telescoped position;
FIGURE 2 is a cross-sectional view of the boom assembly in a partially extended position;
FIGURE 3 is a cross-sectional view of the boom assembly in a fully extended position;
FIGURE 4 is a perspective view of the sliding block of the invention;
FIGURE 5 is a free body diagram of the fly section without the sliding block; and
FIGURE 6 is a free body diagram of the fly section with the sliding block.

Referring now to the drawings wherein like numerals indicate like parts, the boom assembly is generally designated by the numeral 10. The boom assembly is comprised of a base section 12, an intermediate section 14, an outer section 16 and a fly section 18. The base, intermediate, outer, and fly sections are of successively reduced cross-section to permit telescoping. A fluid motor 20 is pivotally connected at its inner end to the base section 12 by a pin 17. The opposite, or outer, end of the motor 20 is pivotally secured by a pin 19 to an upwardly projecting flange 21 on the intermediate section 12. The motor 20 is disposed parallel to the longitudinal axis of the boom sections and is located between the inner upper wall of the base section 12 and the outer upper wall of the intermediate section 12.

A lower fluid motor 22 is pivotally connected at its inner end to the intermediate section 14 by a pin 23 and is connected at its outer end to a block or car 24 to be described hereinafter. It is to be understood that both motors 20 and 22 are of the conventional double-acting hydraulic type well known in the art.

Bearing pads 25, constructed of brass or other relatively soft bearing material, are provided between boom sections to provide for efficient sliding contact. The said bearing pads are slidably inserted into cutouts (not shown) in the inner wall of their respective boom sections.

The outer section 16 has an aperture 26 through the upper wall of its outer end and the bearing pad 25 carried thereby while the fly section 18 has three apertures 28, 30 and 32. The aperture 28 is located through the upper wall of the fly section inner end. The aperture 32 is located through the upper wall of the fly section outer end while the aperture 30 is located inwardly thereof at a predetermined distance.

As best seen in FIGURE 4, the elongated sliding block 24 has a double I-beam cross-section. The block has an upper flange 34 and a lower flange 36 connected by two parallel vertical webs 38. The ends of the webs are tapered upwardly and outwardly at 39. Two sets of vertically aligned apertures 40 and 42 are located on the longitudinal centerline of the flanges 34, 36 and are spaced the same distance apart as the apertures 30 and 32. This invention is primarily directed to the construction of block 24. The block 24 serves as a connecting member between boom sections during boom extension, retraction and use. In this invention it also serves as a structural reinforcing member for the fly section during use.

The boom assembly, as mentioned before, is for use with heavy loads at extreme heights and distances. Within the range of such a large assembly, substantial moments of force are generated by the loads handled by the boom. The fly section, being of substantially the same length as the other boom sections but of reduced cross-section, is, of course, the weakest from a structural viewpoint. Also, it is advantageous to decrease the weight of the fly section as much as possible in order to decrease the moment forces generated at the end of the boom. However, it is imperative to maintain sufficient structural strength in the fly section since safety factors are so critical in the environments in which the equipment is utilized.

As seen in FIGURE 3, the strength of the fly section can be increased if the block 24 extends into the central portion of the fly section a substantial distance and if it traverses that portion of the fly section supported in the outer midsection 16. Referring to the free body diagrams of FIGURES 5 and 6, it is seen how block 24 effectively strengthens the fly section when the fly is extended. In FIGURE 5, the vector forces caused by the load acting on the fly section are confined to a small concentrated area in the vicinity of the end of the outer midsection whereas in FIGURE 6, the vector forces caused by the load are distributed for a longitudinal distance equal to the length of the block. The distribution of resultant forces caused by the elongated block 24 prevents the metal fatigue and failure associated with concentrated forces acting on limited areas.

For positioning purposes, a lug 48 depends downwardly from the inner upper wall of the fly section outer end while a lug 50 projects upwardly from the inner lower wall of the intermediate section 14. The lug 48 is located so that when the block 24 is abutting against it, the apertures 40 and 42 will be aligned with the fly section apertures 30 and 32. The lug 50 is positioned so that when the boom sections are in their fully nested position, the outer section aperture 26 will be aligned with the fly section aperture 30. A removable pin 52 passes through the apertures 26 and 30 to rigidly secure the outer section 16 and the fly section 18 from relative movement.

In operation, the first step necessary to extend the boom assembly 10 from the fully telescoped position of FIGURE 1 is to assure placement of the pin 52 in the apertures 26, 30 and 40. Extension of the upper motor 20 will extend the intermediate section 14, the outer section 16, and the fly section 18 as a unit relative to the base section 12. The second step in boom extension is to remove the pin 52 from the apertures 26, 30 and 40 and replace it through the aperture 32 and bore 42. The lower fluid motor 22 is then extended, thus moving the fly section 18 relative to the intermediate and outer sections 14, 16. Because of the design lengths of the boom sections 16 and 18 and the location of the apertures 26 and 28, full extension of the motor 22 will automatically vertically align the aforesaid apertures 26 and 28. The pin 52 is then removed from the aperture 32 and the bore 42. The block 24 is moved inwardly by retraction of the motor 22 until the bore 40 is vertically aligned with the apertures 26 and 28. The pin 52 is inserted through the said apertures 26 and 28 and the bore 40 and the fluid motor 22 is again extended. This second extension will result in outward movement of the fly section 18 and the outer section 16 relative to the intermediate section 14. Upon completion of this second operation, the boom is in its fully extended position with the sliding block in the proper location to provide structural reinforcement to the fly section.

What has been set forth above is intended primarily as exemplary to enable those skilled in the art in the practice of the invention and it should therefore be understood that the invention may be practiced in other ways than as specifically described.

What is new and therefore desired to be protected by Letters Patent of the United States is:

1. A telescoping boom assembly of a type having
   a hollow first section,
   a hollow fly section telescopically received in said first section,
   a hydraulic motor means for moving said fly section outwardly with respect to said first section to an extended position where only a portion of said fly section is nested in said first section, wherein the improvement comprises
   an elongated reinforcing block carried by said motor means and slidably received in said fly section,
   lock means for securing a first end of said block to said portion,
   said block having a length sufficient to have a further portion extending a substantial distance into that portion of the fly section not nested within said first section, and said block has upper and lower planar surfaces and means connecting said planar surfaces in spaced relationship such that said upper planar surface is in substantially continuous planar contact with a first inner surface of said fly section and said lower planar surface is in substantially continuous planar contact with a second inner surface of said fly section opposing said first inner surface.

2. The invention as described in claim 1 wherein said block is comprised of a pair of spaced, elongated plates each having upper and lower edges, a first plate spanning said upper edges and engaging a first inner surface of said fly section, a second plate spanning said lower edges and engaging an inner surface of said fly section opposing said first inner portion, said first plate being longer than said second plate and said upper edges being longer than said lower edges.

References Cited
UNITED STATES PATENTS
3,368,696  2/1968  Johnston _____ 212—55

FOREIGN PATENTS
1,217,041  5/1966  Germany.

EVON C. BLUNK, Primary Examiner

HARVEY C. HORNSBY, Assistant Examiner

U.S. Cl. X.R.
212—144